United States Patent Office 2,814,204
Patented Nov. 26, 1957

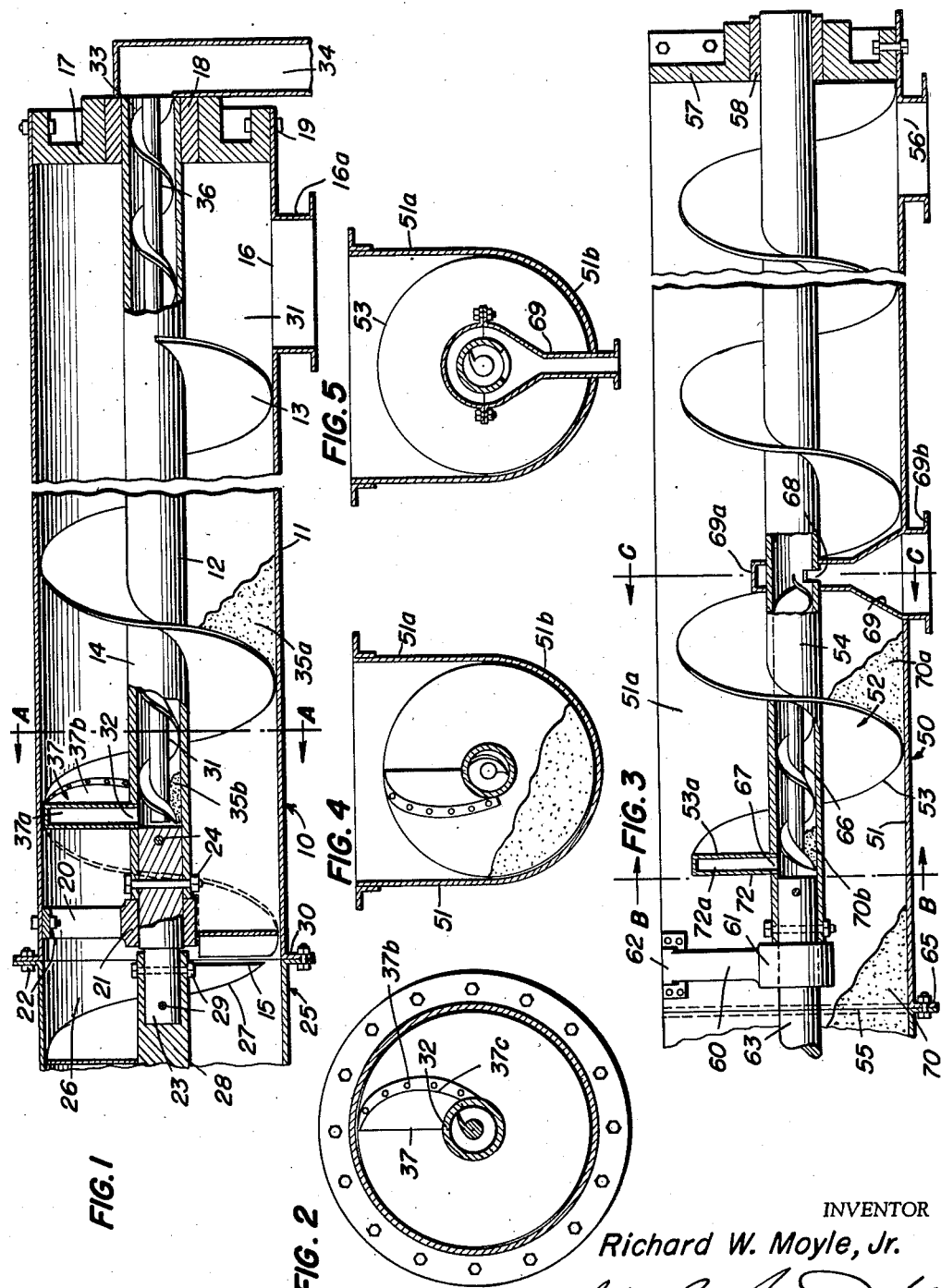

2,814,204

SAMPLE TAKING CONVEYOR

Richard W. Moyle, Jr., Oglesby, Ill.

Application October 7, 1955, Serial No. 539,108

9 Claims. (Cl. 73—424)

This invention relates to conveying and sampling apparatus and more especially to apparatus for conveying fluent solid material such as cement, sand, grain, powdered coal, pulverized coal, or the like, and for taking samples which are representative of the material conveyed.

An object of the present invention is the provision of simple and direct conveying and sample taking apparatus for conveying fluent solid material in principal amounts and for taking and conveying samples which in minor amounts are representative of the principal amounts being conveyed.

Another object of this invention is the provision of reliable conveying and sample taking apparatus by which principal amounts of a fluent solid material and minor amounts of the material taken in the form of samples all are conveyed in a thoroughly satisfactory manner and separately discharged.

A further object of this invention is that of providing a thoroughly satisfactory and reliable conveying and sampling apparatus by which principal amounts of a fluent solid material are conveyed and by which samples in minor amounts are easily and highly representatively taken without substantially interfering with the principal conveying function.

A further object is the provision of conveying and sample taking apparatus wherein samples of the material are substantially continuously taken in representative amounts from the material in advance of the principal amounts already conveyed and discharged.

A still further object is that of taking samples by substantially continuously skimming a highly representative cross section from material in advance of the principal amounts conveyed and discharged, while sustaining thoroughly satisfactory advancement of the principal amounts of the material and the samples along separate feed paths.

Other objects of this invention in part will be obvious and in part pointed out more fully hereinafter.

The invention accordingly consists in the features of components, combination of elements and features of apparatus, and in the relation of each of the same to one or more of the others as described herein, the scope of the application of which is indicated by the following claims.

In the accompanying drawing representing several embodiments of the present invention:

Figure 1 is an elevation partially in section of a conveying and sample taking apparatus;

Figure 2 is a transverse section of the apparatus taken at A—A in Figure 1 adjacent to the sample pick-up scoop;

Figure 3 is an elevation partially in section of a modified conveying and sample taking apparatus;

Figure 4 is a transverse section taken at B—B in Figure 3 proximate to the sample pick-up scoop; and Figure 5 is a transverse section through the sample discharge zone of the apparatus at C—C in Figure 3.

As conducive to a clearer understanding of certain features of this invention, it may be noted at this point that for any of various reasons it is desirable to provide samples of a material being conveyed. In the instance of Portland cement or other fluent solid material it is not unusual for samples to be taken of the material being produced, put into containers, or loaded in bulk for shipment, or for the consignee or consumer to check by sampling a supply of the material received in order to assure that the material meets specifications or otherwise is consistent with expectations.

There are a number of factors which broadly suggest that it is sensible and practical to take samples of the material while it is being conveyed, there being such advantages as having the samples come from the material then being allocated and also by making the conveying and sampling simultaneous operations time is saved as compared with where the operations are separate. In the prior art, however, the conveying and sampling of fluent solid materials such as pulverized products, grain, powder, flakes, or other particulate substances have introduced difficulties, often among which is the problem of procuring a highly representative sample of the material where the material being conveyed has an appreciable depth and segregation is encountered, and the problem of sustaining a satisfactory conveying action on the principal amounts of the material and samples despite the fact that samples continue to be taken.

An outstanding object of the present invention accordingly is the provision of conveying and sampling apparatus wherein conveying and sampling of a fluent solid material such as pulverized products, grain, powder, flakes, or other particulate substances, are simultaneously achieved in a manner giving highly representative samples even where the material being conveyed tends to segregate, all while sustaining thoroughly satisfactory conveying functions both as related to the principal amounts of the material and to the samples themselves.

As illustrated in Figure 1 of the drawing, conveying and sampling apparatus 10 is provided comprising a main conveyor having a helical screw 12 disposed inside the conveyor duct 11 for fluent solid material. The duct 11 is a cylindrical pipe or tube having an inside diameter which preferably is only slightly larger than the effective diameter of the outside diameter of the helical screw 12, thus to hold the fluent solid material ahead of the helical flight blade 13 of the main conveyor. Flight blade 13 is affixed to a hollow shaft 14 of the main conveyor and the shaft is journaled at its ends in bearings 18 and 21. Bearing 18 is mounted centrally in a hub portion of end closure member 17, the latter conveniently being a plug or disc fitting closely inside the end of duct 11 and having a rim or flange abutting the inside surface of the duct. The rim of end closure member 17 is bolted by peripherally spaced bolts 19 to the wall of duct 11 or is otherwise secured so that the end closure member may exercise an obturating function against fluent solid material in the duct and so that bearing 18 is supported in a central axial position with respect to the duct 11. Bearing 21 at the opposite end of hollow shaft 14 of the main conveyor also is supported in a central axial position with respect to duct 11, and in this regard is situated on bearing support bracket 20 radially extending upward from the bearing and having a flange abutting the inside surface of duct 11 and suitably secured to the duct as by means of bolts 22 through the flange and duct wall. A stub shaft 23 telescopes into the adjacent hollow of the main conveyor shaft 14 and is fastened to that end as by bolts 24, thus being an end extension of the shaft 14 and this extension is journaled in the bearing 21. The main conveyor screw in view of bearings 18 and 21 and their supports accordingly has its axis of rotation on the axis of the tubular duct 11.

In Figure 1, the lefthand end of duct 11 affords a material inlet opening 15 to the conveying and sampling apparatus, this for example being the whole open end of the duct. The conveying and sampling apparatus 10 is associated with means for supplying fluent solid material to the inlet 15 of the main conveyor 12, such as a supply conveyor having a helical flight blade 27 affixed to shaft 28 and disposed within supply duct 26 having flange coupling 30 with the main conveyor duct 11. Shaft 28 of the supply conveyor conveniently has a hollow end telescoped over the adjacent end of stub shaft 23 and is fastened as by bolts at 29 to the stub shaft so that the supply conveyor and main conveyor shafts and flight screws rotate as a unit. On achieving the coupling of shaft 28 with the stub shaft 23, the helical flight blades 13 and 27 advantageously continue one from the other in approximately the same helical path, the path being slightly interrupted across the radial bearing support 20 to permit rotation. The main screw conveyor 12 has a bottom outlet 16 for fluent solid material, the outlet being through the wall of duct 12 at the output end of helical blade 13 and behind the duct end closure member 16. A take-off connector 16a, such as for a vertical pipe, conveniently is on the outside of duct 11 at the outlet 16.

The hollow shaft 14 of the main conveyor also serves as the duct of a sample conveyor having a helical flight blade 31 coaxially disposed in the hollow shaft and rotatable with the shaft. The flight blade 31 for example is welded at its outer edge to the inner wall surface of the hollow shaft or otherwise is made integral with the shaft or attached to the same for unitary rotation. Shaft 14 has a sample inlet opening 32 through its wall from the feed passage of main conveyor 12 and is continuously hollow from the sample inlet opening to and through bearing 18 and end closure member 17, to sample discharge opening 33 which empties into a radial extension duct 34 leading to a collecting chamber not shown. The helical flight blade 31 of the sample conveyor is disposed and has its helix directed for feeding samples from inlet opening 32 to outlet opening 33.

A sample-taking scoop 37 is situated over the sample inlet opening 32 through hollow shaft 14, is affixed to the shaft for rotation therewith, and has a sample pick-up throat 37a which is directed across the feed path of conveyor 12 to subtract a representative section from the fluent solid material introduced in advance of principal amounts thereafter conveyed by the main conveyor 12. The throat or concavity of the scoop empties into the sample inlet opening 32 and thence to the input end of the helical flight blade 31 of the sample conveyor. Scoop 37 preferably has a sample-taking reach long enough to generate a scoop-zone substantially completely across the duct 11 when rotated with shaft 14, thus to take representative samples even including segregated material adjacent to the bottom of the duct or when the duct is operating at full capacity.

The sample inlet opening 32 to the sample conveyor advantageously is disposed at the base of the helical flight blade 13 of the main conveyor 12 and on the pressure or material-advancing side face of the blade, and the scoop 37 is formed on this face as a plate having spaced portion 37b and a curved back wall 37c thereto, thus situating the sample inlet opening 32 between the plate and the conveyor side face. This of course involves having the scoop pointed for action in that direction of rotation of helical flight blade 13 required for feeding material through the main conveyor 12. The scoop accordingly is so disposed in proximity to the screw 13 that the scoop skims off a representative section of the material being advanced by the screw. The active throat admission opening of the scoop preferably reaches radially outward from shaft 14 to about the edge of the screw 13 thus for the scoop to skim off or subtract a quite representative section or sample of the material introduced in advance of principal amounts thereafter moved by the screw to outlet 16. Curved wall 37c of scoop 37 lends concavity to the throat 37a and affords a smooth path curving to the opening 32 in shaft 14. The opening 32 illustratively is an arcuate slot having edges substantially flush with the adjacent surface of the scoop plate 37a and the adjacent face of screw 13 to allow the sample to pass freely into the sample conveyor.

To sum up the operation of the conveying and sampling apparatus 10 it may be said that fluent solid material 35 supplied from a suitable source by the supply conveyor means 25 is introduced through inlet 15 to the intake end of helical flight blade 13 of the main conveyor 12. Hollow shaft 14 and blade 13 are rotating in the direction of the arrow on the blade in Figure 1. Scoop 37 also is rotating with the shaft 14 and the material being advanced by thrust of the helical blade 13 has a representative specimen 35b skimmed off by the scoop and this specimen accordingly is by-passed through inlet opening 32 to the sample conveyor flight screw 31 inside the hollow shaft 14. The remainder or principal amount 35a of the material 35 continues on through duct 11 and feeds from the principal outlet opening 16. The samples 35b are advanced within the hollow shaft 14 by the sample conveyor and are discharged from the sample outlet opening 33.

In the modified embodiment represented in Figures 3, 4 and 5, conveying and sampling apparatus 50 is provided having a duct 51 in the form of a trough along which fluent solid material is moved. The trough has a semi-cylindrical bottom 51b and substantially vertical sides 51a. Inside the trough and supported by suitable bearings 58 and 61 is a main conveyor having a screw including helical blade 53 and hollow shaft 54 to which the blade is secured for unitary rotation therewith. The shaft 54 is journaled at its ends in the bearings 58 and 61, bearing 58 being situated in end closure member 57 of the duct 51 and bearing 61 being on a support arm 60 suspended from a cross arm 62 having its opposite ends fastened to the vertical walls 51a of the trough 51. The bearings are so disposed that the helical blade axis of rotation is substantially concentric with the axis of the cylinder axis of the semi-cylindrical bottom 51b and the blade preferably is of such radius as to extend substantially all the way into the bottom thus to act on most all fluent solid material in the bottom and move it longitudinally of the trough 11 on rotation of shaft 54 under drive from a suitable source of power applied for example through suitable connection to the stub extension 63 of shaft 54.

Conveniently, the trough 51 has an outside coupling flange 65 for connecting the trough to a source of fluent solid material supply not shown. The trough accordingly has an inlet end 55 which serves as an inlet opening to the main screw conveyor 52. At the opposite end, the main conveyor has an outlet 56 through the bottom of trough 51 just inside the end closure member 57.

A sample-taking scoop 72 is mounted over a sample by-pass inlet opening 67 through the wall of hollow shaft 54 at the intake end of main conveyor 52 and is secured for rotation with the shaft. Scoop 72 is directed across the longitudinal course of material in the trough 51 to subtract a representative section from principal amounts of the material thereafter longitudinally conveyed by the main conveyor blade 53. The scoop directs material into sample by-pass inlet opening 67, this further being the inlet opening of a helical sample conveyor having the hollow shaft 54 of the main conveyor for a duct and a helical screw 66 along the duct discharging to sample conveyor outlet opening 68 extending through the wall of shaft 54 some distance from sample inlet 67. Scoop 72 preferably has a radial sample-taking reach long enough to generate a scoop-zone substantially completely across the semi-cylindrical bottom of trough 51 when rotated with shaft 54 in the direction of material feed, thus to take representative samples even including segregated material adjacent to the bottom of the duct or when the duct is operating at full capacity. The scoop 67 conveniently is a shaped plate affixed to one of the faces of the material entering end of helical blade 53 and has an entrance to throat 72a at the beginning edge 53a of the helical blade. Throat 72a of the scoop is formed by the space between the helical blade and the scoop and empties into the by-pass inlet opening 67.

The sample conveyor has its outlet opening 68 disposed in sample material delivering relation to a receiving duct 69 extending transversely with respect to shaft 54 and away from the opening 68, thus for the samples to be removed. The helical blade 53 of the main conveyor is interrupted or cut-away along its length to clear the receiving duct 69 and to permit rotation of the shaft 54. Duct 69 conveniently is a substantially vertical hollow post for passing off the sample material by gravity and is secured to the trough bottom 51b for support, thence emptying through an opening in this bottom and affording outside take-off connection 69b. The upper end of duct 69 conveniently is closed around shaft 54 and opening 68, thus to prevent entrance of material other than that picked up by the scoop 72.

Conveying and sampling apparatus 50, on having the helical screw 52 rotated from the drive received from a suitable source of power, admits fluent solid material 70 through inlet opening 55 from supply, and with the screw 52 rotating in the direction indicated by the arrow thereon in Figure 1, a principal amount 70a of the material 70 is pushed along the trough 51 by the pushing side face of helical blade 53, thus to the principal discharge opening 56. The rotation of helical screw 52, however, also renders the scoop 72 active and the scoop generates a skim-off zone on its radius of rotation, thereby subtracting samples from the section of the material introduced. These samples feed through by-pass inlet 67 and are moved along the path afforded by the hollow cavity in shaft 54 to the sample outlet 68. The sample material thereafter feeds by gravity through the sample receiving duct 69 and may be recovered outside the trough 51.

Thus, it will be seen that in this invention conveying and sampling apparatus is provided wherein the various objects noted hereinbefore together with many thoroughly practical advantages are successfully achieved. It will be seen that the apparatus is well suited for use where principal amounts of a fluent solid material are to be conveyed from station to station and especially where representative samples of the material are desired.

While considerable emphasis has been placed in the foregoing disclosure upon conveying and sampling apparatus wherein the main helical screw and the helical screw of the sample conveyor feed the principal amounts of material and the sample material both in the same general longitudinal direction in the apparatus, it will be understood that the sample conveyor screw may instead readily be one having a thread which feeds the sample material in a direction of longitudinal movement which is opposite to the direction of longitudinal movement of the principal amounts, and that under these circumstances the positions of the scoop and its related by-pass inlet to the sample conveyor, and the sample outlet and its related extension sample-receiving duct are disposed to correspond to the proper ends of the sample conveyor screw, still in accordance with the present invention.

As the invention lends itself to many possible embodiments, and as many possible changes may be made in the embodiments hereinbefore set forth, it will be understood that all matter described herein is to be interpreted as illustrative and not as a limitation.

I claim:

1. Conveying and sampling apparatus comprising a main conveyor having an inlet for fluent solid material, a principal outlet for said material and a rotary helical screw for axially conveying amounts of said material along a main feed path from said inlet to said principal outlet, said helical screw being hollow and having sample inlet and outlet openings spaced axially thereof to and from the hollow inside, and helical screw means coaxially inside the screw of said main conveyor and extending between said sample inlet and outlet openings to convey and discharge samples apart from the amounts of said material discharged from the principal outlet.

2. Conveying and sampling apparatus comprising a main conveyor having an inlet for fluent solid material, a principal outlet for said material and a rotary helical screw for axially conveying principal amounts of said material along a main feed path from said inlet to said principal outlet, said helical screw being hollow; a helical conveyor for samples, having a helical screw coaxially inside the screw of said main conveyor and having a sample inlet for samples of said fluent solid material and an outlet for conveying and discharging said samples apart from the principal amounts of said material discharged from said principal outlet, and a scoop externally on said main helical screw for scooping the samples of said fluent solid material away from the feed path of said main conveyor and introducing said samples to said sample inlet.

3. Conveying and sampling apparatus comprising a main conveyor having an inlet for fluent solid material, a principal outlet for said material and a rotary helical screw for feeding principal amounts of said material from said inlet to said principal outlet, said helical screw including a hollow shaft having sample inlet to the hollow inside thereof for receiving samples of said fluent solid material and an outlet from said hollow inside for discharging said samples separate from the principal amounts of said material discharged from the outlet from said main conveyor, a scoop rotatable with said shaft for taking samples from said fluent solid material and feeding said samples into said by-pass inlet, and a helical screw inside said hollow shaft and rotatable therewith for feeding said samples from said sample inlet to said sample discharge outlet.

4. Conveying and sampling apparatus comprising a main conveyor including a duct having an inlet and a principal outlet for fluent solid material and a rotary helical screw in said duct having a helical blade for feeding principal amounts of said material from said inlet to said principal outlet, said helical screw including a hollow shaft having sample inlet to the hollow inside thereof to receive samples of said fluent solid material and said hollow inside extending axially beyond the helical blade of said screw to a sample discharge outlet from said shaft for delivering samples separate from the principal amounts of said material discharge from the principal outlet from said main conveyor, a scoop on the screw of said main conveyor for taking samples from said fluent solid material and feeding said samples into said sample inlet, and a helical screw inside said hollow shaft and rotatable therewith for feeding said samples from said sample inlet to said sample discharge outlet.

5. Conveying and sampling apparatus comprising a main conveyor including a duct having an inlet and a principal outlet for fluent solid material and a rotary helical screw in said duct having a helical blade for feeding principal amounts of said material from said inlet to said principal outlet, said helical screw including a hollow shaft having a sample inlet to the hollow inside thereof to receive samples of said fluent solid material and said hollow inside extending to a sample discharge outlet from said shaft intermediate the length of said helical blade for delivering samples separate from the principal amounts of said material discharged from the principal outlet from said main conveyor, a scoop on the screw of said main conveyor for taking samples from said fluent solid material and feeding said samples into said sample inlet, a sample receiving duct having its inlet end in externally closed rotary coupling with said shaft and open to said sample discharge outlet and extending vertically through the wall of said duct for the samples to be removed, said helical blade being interrupted along its lengthwise extent at said sample discharge outlet to admit said sample receiving duct and tolerate rotation of said rotary helical screw, and a helical screw inside said hollow shaft and rotatable therewith for feeding said samples from said sample inlet to said sample discharge outlet.

6. Conveying and sampling apparatus comprising a main conveyor including a duct having an inlet and a principal outlet for fluent solid material and a rotatable helical screw in said duct for feeding principal amounts of said material from said inlet to said principal outlet, said helical screw being hollow and having a sample inlet thereinto to receive samples of said fluent solid material and said hollow inside extending lengthwise of said screw to a sample discharge outlet, a scoop affixed to said helical screw and having substantially the same radial reach as said screw for skimming samples from said fluent solid material in the direction of material-advancing rotation of said screw, and a helical screw inside the helical screw of said main conveyor and rotatable therewith for moving said samples from said sample inlet to said discharge outlet.

7. Conveying and sampling apparatus comprising a main conveyor including a duct having an inlet and a principal outlet for fluent solid material and a rotary helical screw in said duct having a helical blade for feeding principal amounts of said material from said inlet to said principal outlet, said helical screw being hollow and having a sample inlet thereinto to receive samples of said fluent solid material and said hollow inside extending lengthwise of said screw to a sample discharge outlet, a scoop fixed to said helical blade and having substantially the same radial reach as said blade for skimming samples from said fluent solid material in the direction of material-advancing rotation of said helical screw, said scoop forming a throat with the material-advancing side face of said helical blade and said throat emptying into said material sample inlet, and a helical screw inside the helical screw of said main conveyor and rotatable therewith for moving said samples from said sample inlet to said sample discharge outlet.

8. Conveying and sampling apparatus comprising a main conveyor including a duct having an inlet and a principal outle for fluent solid material and a rotary helical screw in said duct having a helical blade for feeding principal amounts of said material from said inlet to said principal outlet, said helical screw being hollow and having a sample inlet thereinto to receive samples of said fluent solid material and said hollow inside extending lengthwise of said screw to a sample discharge outlet, a scoop fixed to said helical blade and having substantially the same radial reach as said blade for skimming samples from said fluent solid material in the direction of material-advancing rotation of said helical screw, said scoop forming a throat with one of the side faces of said helical blade immediately behind the material intake end edge of said blade and said throat emptying into said material sample inlet, and a helical screw inside the helical screw of said main conveyor and rotatable therewith for moving said samples from said sample inlet to said sample discharge outlet.

9. Conveying and sampling apparatus comprising a main conveyor having an inlet for fluent solid material, a principal outlet for said material and a rotary helical screw for axially conveying amounts of said material along a main feed path from said inlet to said principal outlet, the helical screw of said main conveyor being hollow and having sample inlet and outlet openings spaced axially thereof to and from the hollow inside and a sample taking conveyor having a helical screw united with the inside of the screw of said main conveyor for unitary rotation, the screw of said sample taking conveyor being coaxial with said main conveyor screw and extending between said sample inlet and oulet openings to convey and discharge samples apart from the amounts of said material discharged from the principal outlet.

References Cited in the file of this patent
UNITED STATES PATENTS

| | | |
|---|---|---|
| 751,340 | Raht | Feb. 2, 1904 |
| 1,533,997 | Stenson | Apr. 14, 1925 |
| 1,862,250 | Anderson | June 7, 1932 |
| 2,038,904 | Rand | Apr. 28, 1934 |
| 2,327,123 | Morse | Aug. 19, 1943 |